Patented Sept. 18, 1934

1,974,064

UNITED STATES PATENT OFFICE

1,974,064

RESINOUS COMPOSITION AND METHOD OF FORMING THE SAME

Arthur S. Ford, New York, N. Y., assignor to Industrial Sugar Products Corporation, New York, N. Y., a corporation of Delaware No Drawing. Application June 10, 1931, Serial No. 543,487

14 Claims. (Cl. 260—3)

This invention relates to a process for the formation of a novel composition of matter, and the composition of matter thereby formed.

According to the invention, the process is susceptible of numerous variations in the quantities and character of the ingredients involved, and these variations of the process produce, according to the invention, products of differing characteristics which have various uses in the arts.

It is one of the features of this invention that a hard, strong and durable resinous or plastic substance is produced which takes a number of forms and has differing physical properties and fields of usefulness. In one of the various forms which this invention may take, there is produced a hard, water-white, transparent substance which resembles glass in its appearance, which may be molded under pressure to form objects of any shape, which can be poured into molds when freshly prepared and allowed to harden therein, which when hardened will not soften again at the temperatures of formation, which is slightly elastic, will not shrink, crack or discolor on prolonged exposure to the air or to sunlight, and which will transmit ultra violet light to an extent approximating that of quartz crystal.

Another feature of the invention lies in the production of a glass-like substance which is transparent and water-white in substantial thicknesses exceeding two or three inches, yet which has high tensile strength and great elasticity, and which is adapted to be used in the packaging of goods and merchandise where it is desired to combine strength and protection in the package with complete visibility of the contents.

A further feature of the invention is the production of a plastic or resinous substance having glass-like characteristics of strength and transparency combined with a greater degree of flexibility than glass, which can be made cheaply and economically from raw materials of relatively small cost and commercially available in large quantities.

A further feature of the invention is the production of a plastic molding powder capable of being combined with various inert fillers or other plastics or resins or gums to form, when hot pressed, various articles of utility in various novel effects and shades derived from the fact that the molding powder itself is water-white and transparent and when hot pressed forms a hard glass-like body in which other objects or substances may be permanently and visibly suspended.

A further feature of the invention resides in the production of a novel composition of matter which is transparent and water-white, which will adhere with great tenacity to glass when brought in contact therewith in liquid form and permitted to harden while in such contact, and which has an index of refraction substantially the same as that of glass. Accordingly various articles of commerce composed in part of glass and in part of my novel composition of matter may be produced, in accordance with the invention, wherein the glass and my composition of matter are combined in a unitary structure having the appearance and function of a single piece of glass.

Other features, objects and advantages of the invention will appear in connection with the description which is given below.

This application is a continuation in part of my co-pending application Serial Number 384,230, filed August 7, 1929, for "Synthetic resins". In an application filed by me on even date herewith and identified as S. N. 543,484, I disclose and claim a resinous or adhesive substance made by the condensation or reaction together of a saccharide and an aldehyde in aqueous solution. In an application filed by me on even date herewith and identified as S. N. 543,485, I disclose and claim a water-insoluble resinous substance made by the condensation or reaction together of an anhydrous saccharide and an anhydrous aldehyde such as paraformaldehyde. In an application filed by me on even date herewith and identified as S. N. 543,486, I disclose and claim a composition of matter, formed by the reaction of urea with the substance formed by the reaction or condensation together of a saccharide and an aldehyde.

It is a feature of the present invention that a saccharide is first condensed or reacted with an aldehyde, and the resultant condensation product, either with or without the addition of a methylene hardening agent, is condensed or reacted with an organic acid. The final condensation product so obtained, according to my invention, is a clear water-white fluid which will harden into a glass-like transparent substance which is the novel composition of matter of this application.

A further feature of my invention resides in the method by which the second stage of the reaction of my invention is carried out in order to avoid explosive destruction of the apparatus.

A further feature of my invention resides in the production of a molding powder formed by the pulverization of the hardened product of the second stage of condensation, above referred to, which may be incorporated with inert fillers, such as powdered glass wool, which are themselves transparent or translucent, and the formation of molded objects from mixtures of said molding powder with such fillers to form articles having the appearance of pearl or ivory or opal or are clear and transparent.

In accordance with the present invention a saccharide, or a substance containing a saccharide including particularly but not by way of limitation, cane sugar, invert sugar, glucose, saccharose, levulose, molasses (for the production of a dark brown or black resin or adhesive), or chopped sugar cane which has not been freed of sap (for the production preferably of opaque filled resinous masses) or other mono- or dissacharides, is caused to react with a reagent such as an aldehydic substance or a substance capable of producing an aldehyde, such as formalin, paraformaldehyde or oxymethylene, furfural, or formaldehyde gas, or with an aromatic amine, such as anilin oil. Any one of the saccharides mentioned may be used singly, or two or more of the same may be mixed. Any one of the reagents named above for reaction with the saccharides may be used singly, or two or more thereof may be mixed. The reaction takes place in the presence of a suitable solvent, the use of water being preferred in the practise of the invention.

In the examples which are set forth below I have indicated exact quantities of materials which may be used in the successful carrying out of this invention, but these are illustrative only as the quantities involved may be varied within considerable limits to produce substances having different physical characteristics. I have found that a large amount of the aldehyde or equivalent substance in excess of the quantities stated in the examples is not harmful, as the excess appears to be driven off upon heating. On the other hand, an excess of the saccharide produces a resin which remains sticky and tacky on its outer surface and will not harden properly.

I do not know the nature of the reaction which takes place between the saccharide and the aldehyde, but it would appear that the sugar is fully consumed as the reaction mass which is produced does not have the ordinary physical characteristics of sugar, nor does it have most of the chemical characteristics thereof though it will rotate the plane of transmitted light.

The sugar and the aldehyde, or the equivalents of either, may be mixed together in solution and gradually heated, taking care that the sugar does not caramelize. In one form of the invention I may react together cane sugar and a 36% solution of formaldehyde gas in water. As the temperature is raised there is a slow evolution of formaldehyde gas. Finally a point is reached at which there is a sudden and large increase of ebullition with substantial evolution of gas. This continues for a short time and then, though the temperature is maintained constant or materially increased, the liquid becomes quiet and there is no further substantial evolution of gas. It would appear that when this stage is reached some reaction has taken place between the sugar and the formaldehyde because thereafter the temperature of the liquid may be raised to substantially higher ranges without caramelizing effect. Sugar caramelizes above 100° C. ordinarily, but after the reaction indicated above the temperature of the liquid may be raised above 300° C. without caramelizing effect.

Inasmuch as the reaction between the sugar and the aldehyde preferably occurs without caramelization of the sugar, the reaction will take place below 100° C. when dry sugar and a dry aldehyde are used, and will take place below caramelization temperature when water is present as in case of the use of formaldehyde gas dissolved in water. Accordingly, a reference herein to a substance capable of producing an aldehyde is intended as a reference to a substance which will yield an aldehyde at the reaction temperature, e. g., at temperatures in the neighborhood of 100° C. to 150° C.

Upon completion of the preliminary condensation or reaction between the saccharide and the aldehyde as set forth above, there is then added to the resultant condensation or reaction mass during constant heating a suitable quantity of an organic aliphatic acid, such as tartaric, malic, succinic, lactic, formic or acetic acids, or an aromatic acid such as phthalic acid, added in very small quantities at intervals with constant stirring or agitation of the liquid in order to insure the dissipation of the force of the reaction over a considerable period of time. The use of phthalic acid, especially when used in the form of the anhydride, permits obtaining deepening color effects by prolonging the period of heating after the acid has been added.

The quantities of the acid which should be added are susceptible of variation within considerable limits, and by variations in the quantity thereof it is possible to affect the hardness of the end product. Increasing the amount of the acid will tend to harden the end product and to improve the water-resisting qualities thereof. Decreasing the amount of the acid will tend to produce a slightly softer and more resilient end product. I have found that the use of 150% of the acid, by weight on the sugar originally used, will produce a very hard composition of matter; and the use of 50% of the acid, by weight on the sugar, will produce a slightly yielding and resilient composition of matter.

Upon the addition of each successive portion of the acid a strong evolution of gas takes place which decreases as soon as the portion of the acid added has reacted or combined with the contents of the vessel. During the addition of the acid the reaction mass becomes noticeably thicker, though retaining its water-white characteristic. Upon the addition of the final portion of acid the mass is ready for pouring. When the acid has been got into solution in the reaction mass, thickening progresses very rapidly while the elevated temperature is maintained until the mass will not pour.

If the reaction mass is transferred into molds while still in condition to be poured, the retained heat will cause rapid hardening. If quickly and mechanically cooled while still in condition to be poured it may be kept in this condition indefinitely out of contact with the air. On subsequent heating (as, for example, in molds) hardening will be resumed and the degree thereof may be controlled by the degree of heating and the length thereof; or on subsequent exposure to the air the liquid will harden superficially retaining a rubbery consistency within a hardened skin. If the mass is extruded in the form of rods or ribbons so as to form a large contact with air it solidifies to an extent sufficient to permit pulverization into fine particles which constitute a useful molding powder.

The molding powder thus formed may be pressed into molds under a pressure of 1000 to 2000 pounds and at temperatures of from 150

150°–350° C. according to the moisture content of the powder. Under these conditions the particles will flow together in the mold and form a hard glass-like substance, transparent and water-white in substantial thicknesses, having high tensile strength, and being tough and highly elastic like glass. It is infusible at temperatures up to 500°–550° C. but will char slightly when subjected to a flame in the open air. It is insoluble in acetone, amyl acetate, alcohol, ether or toluol, but the surface is softened slightly after prolonged immersion in water. Formed in a thick pane like glass, it is completely colorless, does not shatter, and is not discolored by long exposure to light.

This molding powder may be incorporated with inert fillers of all kinds, including pigments, and including also powdered glass wool which serves to give increased strength. The use of mixtures of powdered wools made from glass of various colors permits the formation of imitation opals and the like.

The following illustrations are set forth by way of example only:—

*Example 1.*—300 gms. of granulated white sugar were dissolved in an aluminum vessel in 250 cc. of 36% formalin solution at a sufficiently low temperature to prevent caramelization of the sugar. Heat was applied to the vessel and the temperature gradually raised. As the temperature increased there was a slow evolution of formaldehyde gas until the temperature reached a point when there was a vigorous and very large increase of ebullition which continued for a few moments and then, despite further increase of the temperature, all evolution of gas ceased.

After the reaction between the sugar and the formalin had been completed, the temperature was raised still further and higher than the caramelization point of the sugar without discoloration or darkening of the fluid in the vessel. The purpose of this increase of temperature was to promote the expulsion of water vapor and was accompanied by boiling of the liquid. During this boiling 10 gms. of hexamethylenetetramine were added as a hardening agent, the liquid being stirred sufficiently to get the hexamethylenetetramine into solution. After the hexamethylenetetramine was fully dissolved, the temperature was further increased with increased boiling. There was now added to the solution in small installments 350 gms. of tartaric acid. This was sprinkled gently on the surface of the reaction mass in the vessel in ten equal installments of about 35 gms. each, with constant agitation and taking care to see that each installment was fully dissolved before the next was added. This took about half an hour and during this period the heat was maintained considerably above the boiling point of water and stirring was continuous. When the last of the acid had been dissolved the reaction mass was at once poured into molds.

*Example 2.*—In place of the tartaric acid of Example 1 there was substituted 300 gms. of malic acid, observing like precautions, and obtaining like results.

*Example 3.*—In place of the tartaric acid of Example 1 there was substituted 200 gms. of succinic acid, observing like precautions, and obtaining like results.

*Example 4.*—The process described under Example 1 was carried out in all respects as stated, except that the addition of the hexamethylenetetramine was omitted. After the addition of the acid, it was found that the reaction mass rapidly thickened till it could not be poured; but when it was quickly transferred into molds before it had become unpourable and allowed to harden therein it hardened to a substance differing from the substance made in accordance with Example 1 in that neither further heating nor prolonged contact with the air caused it to harden fully, and, on being broken up into powder and hot pressed into molds, it continued to retain its yielding quality though being clear, transparent and water-white.

The reaction mass produced in accordance with Examples 1, 2 and 3 was in one instance poured into a mold, in another instance poured on a polished metal plate for drying in contact with the air, and in another instance extruded as a rod.

The reaction mass of Examples 1, 2 and 3 poured into a mold was found to harden to a transparent, water-white substance which was at first somewhat yielding and resilient, but on exposure to the air, after it had hardened sufficiently to permit the removal of the mold, became progressively tough and more nearly the consistency of hard rubber as time went by. When broken, the interior was found to be somewhat less stress resistant than the exposed surface, but on exposure of the fractured surface to the air this assumed the hard characteristics of the other exposed surfaces. It was found that the mass fully and accurately reproduced every configuration of the mold, including minute scratches or marks.

The reaction mass of Examples 1, 2 and 3 poured on a polished metal plate rapidly hardened in the form of a thin sheet which when removed from the plate was found to have a surface of a highly polished appearance. Because of the thinness of the sheet, and the opportunity given after removal from the plate for curing both surfaces thereof in contact with the air, the sheet became very tough in a few days. It was highly transparent, having brilliant water-white characteristics, and was found to transmit ultra violet rays to an extent greatly superior to that of glass and approximately that of quartz.

The reaction mass of Examples 1, 2 and 3 extruded as a rod was broken up into a molding powder which was permitted to dry. This powder was then pressed into molds under a pressure of about 1000 pounds per square inch at a temperature of 150° C. to form a clear transparent glass-like homogeneous substance similar in general physical characteristics to the poured article, except that the substantial surface hardness of the poured article was found to exist throughout the whole body of the pressed article.

The reaction mass produced in accordance with Example 4 was in one instance poured into a mold, in another instance poured on a polished metal plate for drying in contact with the air, and in another instance extruded as a rod.

The reaction mass of Example 4 poured into a mold was found to harden to a resilient, water-white substance which was yielding and resilient and remained in that condition after removal of the mold and after prolonged exposure to the air. Its surface however was firm, dry and non-tacky. When broken the interior was found to be somewhat softer and slightly tacky but on exposure of the fractured surface to the air it quickly became dry and non-tacky and gradually hardened somewhat.

The reaction mass of Example 4 poured on a polished metal sheet rapidly acquired a dry and non-tacky surface but despite long exposure to the air remained resilient like soft rubber. It was highly transparent and brilliantly water-white.

The reaction mass of Example 4 extruded as a rod was broken up into a powder and exposed to the air. To this powder was added 7% to 10% by weight of dry powdered crystals of hexamethylenetetramine, and after the two powders had been thoroughly incorporated together by stirring and kneading, they then constituted a molding powder which was pressed into molds under a pressure of about 1000 pounds and at a temperature of 250° C. A substance was formed in the mold having approximately the same characteristics as the poured or molded substance made in accordance with Example 1.

The molding powder made in accordance with either of the methods disclosed above has a variety of fields of usefulness either alone or as a binder to be incorporated with suitable inert fillers in the preparation of tough durable molded articles which may have a wide range of properties depending on the ingredients selected. Thus, opacity may be obtained by the use of inert fillers such as ground-up synthetic or natural resins or gums, waxes, fats, reclaimed rubber, cellulose nitrate or acetate, or the like, or synthetic condensation products. Water-resisting qualities may be obtained by the incorporation of suitable oils such as castor or linseed oil. Transparency may be obtained by the use of powdered glass wool. Special effects may be obtained by the use of colored powdered glass wool, or combinations of powdered glass wool of differing colors. Dielectric strength may be obtained by the addition of any inert non-metallic substances, including those named above, which serve to give strength and rigidity to the mass.

The molding powder above referred to, when mixed with the other substances mentioned, may be pressed into molds under a pressure of 1000 to 2000 pounds per square inch at a temperature of 150°–350° C. Thus a resin may be produced, which has high tensile strength, and is capable of being machined, turned and polished.

Molded objects formed under pressure and composed of 90% finely powdered glass wool and 10% of my molding powder, after being subjected to a pressure of 2000 pounds per square inch and at 200° C., were found to be exceedingly hard. The mixing of finely chopped wool of colored glass, in various proportions, enabled me to produce a satisfactory imitation opal of a high degree of hardness.

My invention also enables me to produce filled resins by direct pouring and casting. Thus, to the heated reaction mass before it has so far hardened as to be unpourable, may be added inert fillers of many kinds, and in particular those inert fillers mentioned above in connection with filled resins made from my molding powder. These may be introduced at any convenient stage of the heating process before the reaction mass has thickened to such an extent as to make incorporation of the filler impossible. As an example of the foregoing, finely chopped sugar cane which has not been freed of sap may be used as the saccharide in the initial stage of the reaction. In this case the cellulose particles of the cane furnish an inert filling material and the reaction mass, after introduction of the acid, may be poured to provide a cellulose filled resin by direct pouring and casting.

In accordance with the foregoing disclosure, I am able to make a composition of matter having among others the following properties:—

The poured or extruded substance of this invention may have varying degrees of hardness depending on whether a hardening agent such as hexamethylenetetramine is used, and also depending on the proportions of acid added in the second stage of condensation or reaction. Thus my composition of matter may be made yielding or resilient, or it may be made as hard as very hard vulcanized rubber, within the invention. It is brilliantly clear and transparent and is perfectly water-white. Cast or pressed in sections having a thickness of several inches it offers almost no obstacle to vision, and will transmit the entire spectrum and especially the ultra violet rays to an extent approximating that of quartz. It is not thermo-plastic but will char superficially when strongly heated in the open air. It is free from any trace of the odor of formaldehyde or any of the other ingredients. It will rotate the plane of transmitted light, as do sugar crystals, but differs from sugar in most other properties. It is insoluble in most of the usual spirit solvents used singly but will dissolve in combination of some of them. It is slightly softened, superficially, on long exposure to water. It will not shrink, crack or discolor on prolonged exposure to air or sunlight. It has high tensile strength and stress resistance in its hardened forms.

The molding powder of this invention may be employed as a binder in the making of substances whose properties may vary within wide limits depending on the choice of the ingredients that are incorporated with the molding powder. Among other properties which may be obtained by the use of my molding powder with suitable fillers are high dielectric strength, extreme hardness, opacity or transparency, complete water-insolubility, and a choice of colors and color combinations including especially effects obtained by suspending colored opaque bodies of large or small size within otherwise transparent bodies of my composition of matter.

The composition of matter herein disclosed, and the process of making it, is not to be confused with the previously known therapeutic and medicinal substances containing a sugar and formaldehyde. These substances are adapted to dissociate readily into antiseptic formaldehyde and soluble sugar when brought into contact with living tissue and differ in nearly all properties from the composition of matter disclosed hereinabove. They exist either as a liquid having no plastic properties or as a dry powder which lacks the properties of my molding powder hereinabove described.

I claim:

1. The process of making a plastic substance which comprises reacting together the product of the reaction of a saccharide of the group consisting of mono- and di-saccharides and an aldehyde, and an alipthatic carboxylic acid.

2. The process of making a plastic substance which comprises reacting together the product of the reaction of a sugar and an aldehyde, and an aliphatic carboxylic acid.

3. The process of making a plastic substance which comprises reacting together the product of the reaction of a saccharide of the group consisting of mono- and di-saccharides and formaldehyde, and an aliphatic carboxylic acid.

4. The process of making a plastic substance which comprises reacting together the product of the reaction of a sugar and aldehyde, and an aliphatic carboxylic acid selected from the group consisting of tartaric, malic, succinic, lactic, formic and acetic acids.

5. The process of making a plastic substance which comprises reacting together the product of the reaction of a sugar and formaldehyde, and an aliphatic carboxylic acid selected from the group consisting of tartaric, malic, succinic, lactic, formic and acetic acids.

6. The process of making a plastic substance which comprises reacting together the product of the reaction of a saccharide of the group consisting of mono- and di-saccharides and an aldehyde, and an aliphatic carboxylic acid and heating the reaction mass sufficiently to cause it to harden.

7. The process of making a plastic substance which comprises reacting together the product of the reaction of a saccharide of the group consisting of mono- and di-saccharides and formaldehyde, and an aliphatic carboxylic acid and heating the reaction mass sufficiently to cause it to harden.

8. The process of making a plastic substance which comprises reacting together the product of the reaction of a saccharide of the group consisting of mono- and di-saccharides and formaldehyde, and an aliphatic carboxylic acid and heating the reaction mass sufficiently to cause it to harden.

9. A plastic substance formed by the reaction of an aliphatic carboxylic acid with the reaction mass of a sugar and a substance capable of producing formaldehyde at the reaction temperature.

10. A plastic substance formed by the reaction of an aliphatic acid selected from the group of aliphatic carboxylic acids consisting of tartaric, malic, succinic, lactic, formic and acetic acids, with the reaction mass of a saccharide of the group consisting of mono- and di-saccharides and a substance capable of producing formaldehyde at the reaction temperature.

11. A plastic substance formed by the reaction of an aliphatic acid selected from the group of aliphatic carboxylic acids consisting of tartaric, malic, succinic, lactic, formic and acetic acids, with the reaction mass of a sugar and a substance capable of producing an aldehyde at the reaction temperature.

12. A molding powder for use in forming plastic substances comprising the pulverized product of claim 9.

13. A molding powder for use in forming plastic substances comprising the pulverized product of claim 10.

14. A molding powder for use in forming plastic substances comprising the pulverized product of claim 11.

ARTHUR S. FORD.